Figure 8:
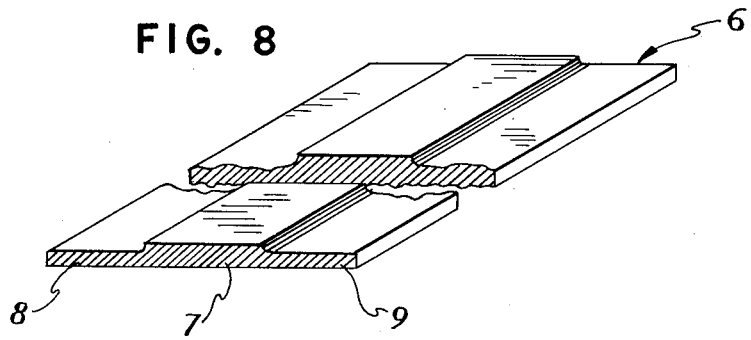

June 5, 1962  C. D. PETERSON  3,038,138
COLLECTOR RING ASSEMBLY
Filed Jan. 30, 1959  2 Sheets-Sheet 1
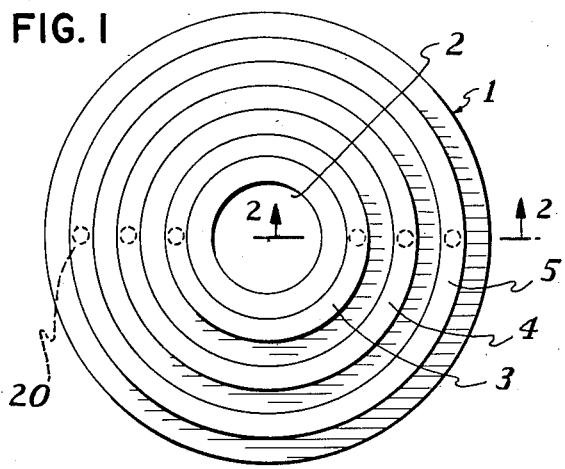
FIG. 1
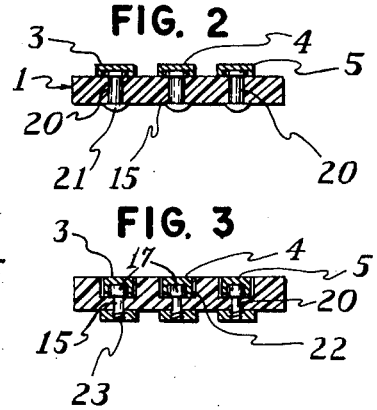
FIG. 2
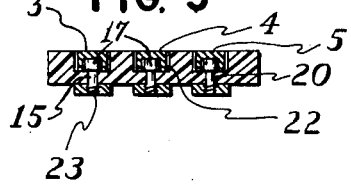
FIG. 3
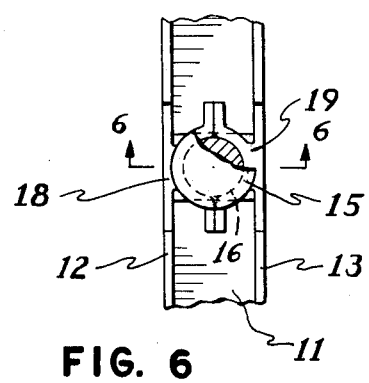
FIG. 4
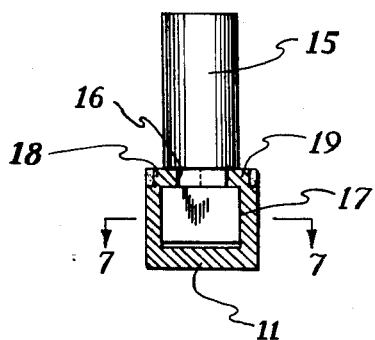
FIG. 5
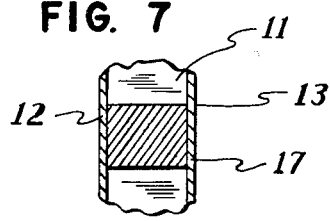
FIG. 6
FIG. 7
INVENTOR.
CARL D. PETERSON
BY Karl Huber
James E. Bryan
Alan C. Rose
ATTORNEYS June 5, 1962 C. D. PETERSON 3,038,138
COLLECTOR RING ASSEMBLY
Filed Jan. 30, 1959 2 Sheets-Sheet 2

INVENTOR.
CARL D. PETERSON
BY Karl Huber
James E. Bryan
Alan C. Rose
ATTORNEYS 3,038,138
COLLECTOR RING ASSEMBLY
Carl D. Peterson, North Attleboro, Mass., assignor, by mesne assignments, to Engelhard Industries, Inc., Newark, N.J., a corporation of Delaware
Filed Jan. 30, 1959, Ser. No. 790,100
4 Claims. (Cl. 339—5)

The present invention relates to a collector ring assembly and method of manufacture thereof and is concerned in particular with a concentric collector ring assembly of the type associated with a plurality of electrical brush elements.

In the production of concentric collector ring assemblies the electrically conductive rings are generally mounted on a non-conductive base and insulated from each other by an insulating material disposed between the adjacent rings.

There are several methods for producing the collector ring assemblies among which is the method of machining a plurality of individual conductive rings each dimensioned for spaced concentric positioning with respect to each other and then molded into a non-conductive material such as a non-conductive plastic material which forms a base for the ring assembly and simultaneously forms concentric insulating elements disposed between the spaced rings. With such method it is difficult to arrange the rings accurately concentrically and to keep them concentric during the molding operations. Also, plastics suitable for molding have a different coefficient of expansion from that of the metal rings and the finished plate assembly is subject to warping with temperature variations. The difficulty encountered is increased when thermosetting plastics are employed since the hard worked metal rings, e.g. silver rings, may be softened.

Another method involves the use of a laminated plastic mount, or a plastic containing filler material, which provides a rigid plate. The rigid plastic plate is machined to form concentric grooves therein in which grooves individual metal rings are concentrically inserted and secured, e.g. by cementing. With such method it is difficult to match the rings and grooves and to keep them accurately concentric. In a modification of the above mentioned method wherein the machined grooves of the plastic plate are filled with electro-deposited metal, e.g. silver, considerably more work is required and the laminated plastic, etc. is likely to become contaminated with the plating solution to the detriment of the electrical insulating properties of the plastic or other insulating material.

Apart from the above, there are certain disadvantages associated with the bonding of either conductive leads or mounting posts or pins to the conductive rings. For example, in brazing or welding operations for mounting conductive or mounting members to the ring, the heat developed in such operations produces spot anneals at the location of the bond with the resulting lack of concentricity of the ring by disturbing the preset dimensions thereof. Otherwise the electrical characteristics of the ring are affected by localized grain growth or by localized hardening of the ring.

Figure 9:
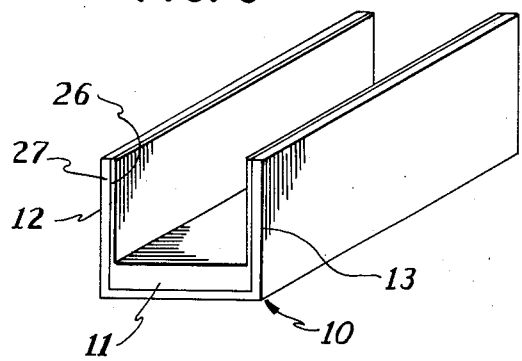
Figure 10:
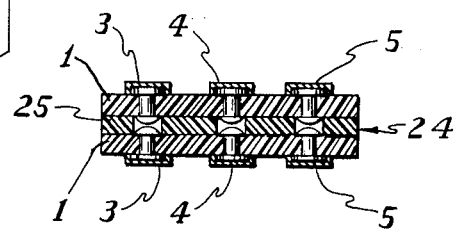
Figure 11:
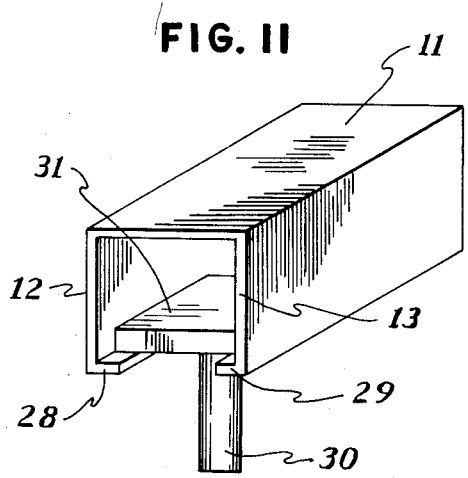
Figure 12:
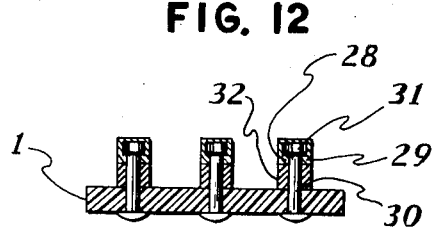

It is an object of the present invention to provide a collector ring assembly and method for the manufacture thereof which assures accurate concentricity of the rings and retains all the insulating properties of the insulating bases and insulating members between the spaced adjacent rings. It is another object of the present invention to provide a collector ring assembly and method of manufacture thereof which precludes the disadvantages of conventional collector rings and which assures reliable electrical conducting properties. Other objects and advantages of the present invention will become apparent from the description hereinafter following and the drawings forming a part hereof, in which:

FIGURE 1 illustrates a top view of a collector ring assembly according to the present invention, FIGURE 2 illustrates a cross-sectional view along lines 2—2 of FIGURE 1, FIGURE 3 illustrates a cross-sectional view of a modification of FIGURE 2, FIGURE 4 illustrates a bottom view of a collector ring according to the invention, FIGURE 5 illustrates an enlargeed fragmentary view of FIGURE 4, FIGURE 6 illustrates a cross-sectional view along lines 6—6 of FIGURE 5, FIGURE 7 is a cross-sectional view along lines 7—7 of FIGURE 6, FIGURE 8 is an isometric view of a longitudinal strip material employed in the manufacture of the collector ring, FIGURE 9 is an isometric view of a longitudinal channel member formed from the strip of FIGURE 8, FIGURE 10 is a cross-sectional view of another modification of FIGURES 2 and 3, FIGURE 11 is an isometric view of a modification of FIGURE 5, and FIGURE 12 is a cross-sectional view of still another modification of FIGURES 2 and 3.

According to the present invention there is provided a collector ring assembly comprising a conductive ring or concentric conductive rings mounted either on one side of a dielectric or insulating mount or on both sides thereof. The invention resides particularly in the combination of the collector ring assembly and the structure of the conductive rings and mounting means therefor, whereby the desirable electrical properties of the conductive rings are enot adversely affected in the mounting of the rings to the dielectric mount or support.

FIGURE 1 illustrates one type of collector ring assembly comprising a substantially flat mount 1 in the form of a plate having a central opening 2 therethrough. Concentric conductive rings 3, 4 and 5 are mounted on a surface of the plate in spaced relation to each other and operable in combination with electrical brush members as well known in the art.

In the manufacture of the particular conductive ring and mounting means therefor according to the invention, a longitudinal strip 6 of electrically conductive metal according to FIGURE 8, e.g. silver, is provided, e.g. by rolling, with a relatively thick central portion 7 along the length thereof, and thinner parallel skirts 8 and 9 on both sides of the central portion 7. The skirts 8 and 9, according to FIGURE 9, are subsequently turned in a common direction to provide a substantially U-shaped longitudinal channel member 10 having a base 11 and substantially parallel legs 12 and 13. The channel member 10 is then formed into a ring 2, as illustrated by FIGURE 4, with the ends of the channel member 10 joined as at 14, and with the channel opening of the ring facing in the direction of the ring axis.

Having provided the ring according to FIGURE 4, a pin or post 15 is inserted into the channel of the ring 2 with an end thereof in abutment with the base 11. The post is preferably provided with an annular recess 16 near an end portion thereof and the post head 17 between the end of the post and the annular recess 16 is preferably of non-circular shape or cross-section, e.g. of a rectangular cross-section with the sides thereof snugly fitted between the legs 12 and 13 as illustrated by FIGURES 6 and 7. With the post head 17 seated in the ring channel, portions 18 and 19 of the legs 12 and 13 on opposite sides of the post 15 and adjacent the annular recess 16, as illustrated by FIGURES 5 and 6, are displaced and crimped or otherwise formed into engagement with the annular recess and thereby mechanically fixing the post 16 in the channel member 10. Preferably, the displaced portions 18 and 19 of the legs 12 and 13 are in the form of short narrow strips displaced from the marginal portions of the legs and crimped into a collar engaging the annular recess 16. In practice, the channel member 10 is provided with a plurality of such posts 15, 16, 17 and 18 circumferentially spaced in the channel member 10.

With the rings 3, 4 and 5 constructed as above described, they are mounted onto the dielectric ring or plate 1, as illustrated by FIGURE 2, with the posts 15 passing through apertures 20 selectively formed through the plate 1. The end portions of the posts 15 preferably extend outwardly of the apertures 20 and are mechanically spun to provide a rivet head 21 tightly securing the rings 3, 4 and 5 to the plate 1.

FIGURE 3 illustrates a modification of FIGURE 2, whereby the plate 1 is provided with annular recesses 22 in the surface thereof. The annular recesses are concentric and spaced from each other. The rings 3, 4 and 5 are seated in the recesses with the posts 15 passing through plate apertures 20. The ends of the posts extending outwardly of the apertures 20 and threaded as at 23 and a nut is secured in threaded engagement with the post to secure the rings to the plate.

FIGURE 10 shows a modification whereby the dielectric plate may be a laminated plate 24 having a pair of layer plates 1 with conductive rings 3, 4 and 5 mounted thereon and the plates being in back-to-back relationship with a dielectric layer 25 therebetween.

FIGURE 11 illustrates a modification of FIGURE 5 in that the walls are provided with inwardly disposed rims 28 and 29 which retain a plurality of posts such as post 30 mechanically mounted in the ring channel by means of the enlarged seat of head 31 abutting the inner surfaces of the rims. In this modification the posts 30 are circumferentially slidable so that the posts can be moved into alignment with the apertures of the plate 1 during the mounting of the rings onto the insulating plate.

FIGURE 12 illustrates a modification of FIGURES 2 and 3 in that a ring of the type illustrated by FIGURE 11 is vertically spaced from the plate 1 by means of a collar 32 positioned on the post 30 between the ring and the plate 1.

While FIGURE 8 shows a strip 6 composed of a single metal, it may also be provided as a composite strip composed of conductive layers, e.g. a brass layer 26 and a silver layer 27 to form a channel member as illustrated by FIGURE 9.

While the FIGURES 2 and 3 show, respectively, a rivet head 21 and a nut 23 to secure the rings to the plate 1, the securing means may be varied according to choice. For example, the free end of the post 15 may be drilled to accommodate a screw for securing the rings in lieu of the rivet head and nut.

Various other modifications of the invention are contemplated within the scope of the appended claims.

What is claimed is:

1. A collector ring assembly comprising an apertured plate, a channeled conductive ring affixed to the plate, the conductive ring having a substantially U-shaped cross-section, an elongated post member having an end portion seated in the channel, a groove in said end portion, a portion of the post member extending outwardly of the channel in the direction of the ring axis, opposite marginal portions of the channel walls being displaced into circumferential embracing engagement with the groove, the extending portion of the post passing into the plate aperture.

2. A collector ring assembly according to claim 1, comprising a plurality of said rings affixed to said plate in spaced concentric relationship to each other.

3. A collector ring assembly according to claim 1, wherein the portion of the post seated in the channel is of a non-circular cross-section.

4. A collector ring assembly according to claim 1, wherein the wall portions form a collar about said post.

References Cited in the file of this patent

UNITED STATES PATENTS

| | | |
|---|---|---|
| 2,037,457 | Colson | Apr. 14, 1936 |
| 2,081,100 | Blakeslee | May 18, 1937 |
| 2,634,342 | Baechler et al. | Apr. 7, 1953 |
| 2,725,540 | Scott | Nov. 29, 1955 |